United States Patent
Hahn et al.

[11] Patent Number: 5,093,374
[45] Date of Patent: Mar. 3, 1992

[54] EXPANDABLE MOLDING COMPOSITIONS HAVING HIGH HEAT DISTORTION RESISTANCE, AND THE PREPARATION THEREOF

[75] Inventors: Klaus Hahn, Kirchheim; Uwe Guhr, Gruenstadt; Hans Hintz, Ludwigshafen; Dietmar Wittenberg, Mannheim, all of Fed. Rep. of Germany

[73] Assignee: BASF Aktiengesellschaft, Ludwigshafen, Fed. Rep. of Germany

[21] Appl. No.: 544,897

[22] Filed: Jun. 28, 1990

[30] Foreign Application Priority Data

Jul. 27, 1989 [DE] Fed. Rep. of Germany ....... 3924868

[51] Int. Cl.$^5$ ............................. C08J 9/16; C08J 9/28; C08L 81/00
[52] U.S. Cl. ....................................... 521/59; 521/69; 521/70; 525/189
[58] Field of Search ............................ 521/59, 69, 70; 525/189

[56] References Cited

U.S. PATENT DOCUMENTS 5,010,111  4/1991  Hahn et al. ........................... 521/56

FOREIGN PATENT DOCUMENTS 294,783  12/1988  Europe .
315,478  5/1989  Europe .
357,934  3/1990  Europe .
1,368,544  12/1964  France .

Primary Examiner—Maurice J. Welsh
Assistant Examiner—T. Mosley
Attorney, Agent, or Firm—Oblon, Spivak, McClelland, Maier & Neustadt

[57] ABSTRACT

Expandable molding compositions having high heat distortion resistance and containing from 80 to 99% by weight of a styrene polymer, 1 to 20% by weight of poly-1,4-phenylene sulfide, from 1 to 10% by weight of a $C_3$-$C_6$-hydrocarbon as blowing agent and, if desired, customary additives, are obtained by suspension polymerization of a solution of the polyphenylene sulfide in styrene.

5 Claims, No Drawings

EXPANDABLE MOLDING COMPOSITIONS HAVING HIGH HEAT DISTORTION RESISTANCE, AND THE PREPARATION THEREOF

The present invention relates to foams based on a mixture of styrene polymers and polyphenylene sulfide, which have high heat distortion resistance.

It is an object of the present invention to provide expandable molding compositions suitable for the production of heat-resistant foam moldings. It is a further object of the present invention to improve the oil-resistance of foams of this type.

Surprisingly, we have found that these objects are achieved by expandable molding compositions based on styrene polymers and polyphenylene sulfide.

The present invention accordingly provides expandable molding compositions having high heat distortion resistance and containing a) from 80 to 99% by weight of one or more styrene polymers, b) from 1 to 20% by weight of poly-1,4-phenylene sulfide, c) from 1 to 10% by weight, based on the sum of a) and b), of a $C_3$- to $C_6$-hydrocarbon as blowing agent, and, if desired, d) customary additives in effective amounts.

The present invention furthermore provides a process for the preparation of these expandable molding compositions which comprises polymerizing a solution of poly-1,4-phenylene sulfide in styrene in aqueous suspension and adding the blowing agent during or after the polymerization.

The novel expandable molding compositions are generally in the form of beads, due to the preparation by suspension polymerization. The particles have a virtually spherical shape. The beads have a mean diameter of from about 0.1 to 6 mm, preferably from 0.2 to 4 mm, in particular from 0.3 to 3 mm.

Suitable styrene polymers a) are polystyrene and copolymers containing 50% by weight or more of styrene in copolymerized form. Examples of suitable comonomers are α-methylstyrene, ring-halogenated styrenes, ring-alkylated styrenes, acrylonitrile, (meth)acrylates of alcohols having from 1 to 8 carbon atoms, N-vinyl compounds, such as N-vinylcarbazole, and maleic anhydride. The styrene polymer preferably contains a small amount of a crosslinking agent in copolymerized form, i.e. a compound containing more than one, preferably two, polymerizable double bonds, such as divinylbenzene, butadiene or butanediol diacrylate. The crosslinking agent is generally used in an amount of from 0.005 to 0.05 mol-%, based on styrene. Styrene polymers which contain at least 5% by weight, in general 5-17% by weight, preferably 5-10% by weight, of acrylonitrile in copolymerized form result in molding compositions having high oil resistance. To this end, the styrene polymer advantageously used is a mixture of polystyrene and a styrene-soluble styrene-acrylonitrile copolymer, in particular a mixture of 50-83% by weight, preferably 60-80% by weight of polystyrene and 17-50% by weight, in particular 20-40% by weight of a styrene-acrylonitrile copolymer containing about 15-35% by weight, in particular 20-30% by weight of copolymerized acrylonitrile.

Styrene polymer a) is used in an amount of from 80-99% by weight, preferably 85 to 98% by weight, in particular 90 to 97% by weight, based on the sum of a) and b).

The expandable molding compositions contain, as further component b), from 1 to 20% by weight, preferably from 2 to 15% by weight, in particular from 3 to 10 % by weight, of poly-1,4-phenylene sulfide.

As blowing agent, the molding compositions contain from 1 to 10% by weight, preferably from 3 to 8% by weight, in particular from 5 to 7% by weight, of a $C_3$- to $C_6$-hydrocarbon, such as propane, butane, isobutane, n-pentane, i-pentane, neopentane and/or hexane. A commercially available pentane mixture is preferably used.

As further additives, the expandable molding compositions can contain customary dyes, fillers, stabilizers, flameproofing agents, synergists, nucleating agents, lubricants and the like in customary, effective amounts.

The bead-form expandable molding compositions are prepared by suspension polymerization. To this end, polyphenylene sulfide or a mixture of polyphenylene sulfide and polystyrene, as is obtainable as a commercial product, and, if desired, the styrene-acrylonitrile copolymer are dissolved in styrene, if desired further copolymers and if desired the crosslinking agent are added, and this solution is polymerized in aqueous suspension, expediently with addition of a customary suspension aid. The blowing agent is either introduced together with the other starting materials of the polymerization or added during the polymerization. However, addition of the blowing agent to the batch may be delayed until the polymerization is complete. The bead-form expandable polymers obtained are then separated off from the aqueous phase, washed and dried.

The expandable molding compositions can be foamed in a known manner in customary pre-foamers using hot air or steam to give bead-form foam particles. The foam beads can be welded together in a manner known per se by heating in nongas-tight molds to form moldings.

In the Examples, parts are parts by weight.

EXAMPLE 1

A mixture of 200 parts of water, 0.1 part of sodium pyrophosphate, 0.15 part of tert-butyl perbenzoate, 0.45 part of benzoyl peroxide, 100 parts of a solution of 4 parts of poly-1,4-phenylene sulfide and 0.01 part of divinylbenzene in 96 parts of styrene, 7 parts of pentane and 3 parts of a 10% strength aqueous solution of polyvinylpyrrolidone was heated to 90° C. with stirring in a pressure-tight stirred reactor, kept at 90° C. for 5 hours and subsequently heated at 100° C. for 2 hours and at 120° C. for a further 2 hours. After cooling, the resultant bead polymer having a mean bead diameter of 0.8 mm was separated off from the aqueous phase, washed and dried. The resultant product was foamed in a commercially available continuous stirred Rauscher pre-foamer, using flowing steam to form foam beads (bulk density 20 g/l). After interim storage for 24 hours, the foam beads were introduced into a Rauscher block mold and welded to form a block by steam treatment at 1.8 bar for 20 seconds. The interior of the foam was completely free of voids and flaws. The heat distortion resistance in accordance with DIN 53 424 was 110° C.

EXAMPLE 2

The procedure followed was as in Example 1, but without the use of divinylbenzene. The interior of the resultant foam was entirely free of voids and flaws. The heat distortion resistance in accordance with DIN 53 424 was 107° C.

EXAMPLE 3

The procedure followed was as in Example 1, but 100 parts of a solution of 6 parts of poly-1,4-phenylene sulfide and 0.01 part of divinylbenzene in 94 parts of styrene was used. The resultant foam was entirely free of voids and flaws. The heat distortion resistance was 114° C.

EXAMPLE 4

The procedure followed was as in Example 3, but without the use of divinylbenzene. The foam was entirely free of voids and flaws. The heat distortion resistance was 112° C.

EXAMPLE 5 (comparison)

The procedure followed was as in Example 1, but without the use of poly-1,4-phenylene sulfide. The foam had a heat distortion resistance of 102° C.

EXAMPLE 6

The procedure followed was as in Example 1, but 100 parts of a solution of 6 parts of a blend of poly-1,4-phenylene sulfide and polystyrene (weight ratio 80:20) and 25 parts of a styrene-acrylonitrile copolymer (70/30% by weight) and 0.01 part of divinylbenzene in 69 parts of styrene were used.

The heat distortion resistance of the foam is 112° C. In order to test the oil resistance, samples of the foam (5×5×5 cm) were stored in heating oil and in diesel oil in accordance with DIN 53 428. The foam was unchanged after storage for 72 hours.

EXAMPLE 7

The procedure followed was as in Example 6, but without the use of divinylbenzene.

The heat distortion resistance of the foam is 110° C. The foam is stable to heating oil and diesel oil.

We claim:

1. An expandable molding composition having high heat distortion resistance and containing
   a) from 80 to 99% by weight of one or more styrene polymers,
   b) from 1 to 20% by weight of poly-1,4-phenylene sulfide,
   c) from 1 to 10% by weight, based on the sum of a) and b), of a $C_3$- to $C_6$-hydrocarbon as blowing agent, and, if desired,
   d) customary additives in effective amounts.

2. An expandable molding composition as claimed in claim 1, containing, as component a), a polystyrene prepared using from 0.005 to 0.05 mol-% of a crosslinking agent.

3. An expandable molding composition as claimed in claim 1, wherein component a) is a mixture of
   a1) from 50 to 83% by weight of polystyrene and
   a2) from 17 to 50% by weight of a styrene-soluble styrene-acrylonitrile copolymer, the acrylonitrile content being 5% by weight or more, based on the sum of a1) and a2).

4. A process for the preparation of an expandable molding composition as claimed in claim 1, which comprises polymerizing a solution of poly-1,4-phenylene sulfide in styrene in aqueous suspension, and adding the blowing agent during or after the polymerization 5. A process for the preparation of an expandable molding composition as claimed in claim 3, which comprises polymerizing a solution of poly-1,4-phenylene sulfide and styrene-acrylonitrile copolymers in styrene in aqueous suspension in the presence of the blowing agent, and adding the blowing agent during or after the polymerization.

* * * * *